United States Patent [19]

Luckanuck

[11] Patent Number: 5,045,385

[45] Date of Patent: Sep. 3, 1991

[54] FIRE RETARDANT COMPOSITION FOR BUILDING PANELS AND DOOR CORES

[75] Inventor: John S. Luckanuck, Burlington, Canada

[73] Assignee: Radixx World, Ltd., Burlington, Canada

[21] Appl. No.: 400,448

[22] Filed: Aug. 30, 1989

[51] Int. Cl.$^5$ .................... C09K 21/02; E04B 1/94; E06B 5/16

[52] U.S. Cl. ...................... 428/220; 52/455; 52/809; 106/18.12; 106/831; 252/601; 428/325; 428/330; 428/331; 428/920; 428/921; 524/6

[58] Field of Search ............ 428/325, 330, 331, 323, 428/303, 438, 921, 68, 70, 220, 74, 920; 252/601, 609; 106/18.12, 631; 52/455, 809; 524/6

[56] References Cited

U.S. PATENT DOCUMENTS

| | | | |
|---|---|---|---|
| 3,876,449 | 4/1975 | Smith et al. | 427/282 |
| 4,201,247 | 5/1980 | Shannon | 428/34.5 X |
| 4,619,954 | 10/1986 | Warner, II | 428/268 |
| 4,746,555 | 5/1988 | Luckanuck | 428/35 |
| 4,767,686 | 8/1988 | Chee et al. | 428/116 |
| 4,818,595 | 4/1989 | Ellis | 428/245 |

FOREIGN PATENT DOCUMENTS 53-64230  6/1978  Japan .................. 106/18.12

*Primary Examiner*—George F. Lesmes
*Assistant Examiner*—Christopher Brown
*Attorney, Agent, or Firm*—Tilton, Fallon, Lungmus & Chestnut

[57] ABSTRACT

A fire retardant composition and method wherein the composition includes 30 to 75% of an inert mineral filler selected from perlite and vermiculite, 10 to 40% by weight of glass fibers having a diameter in the range of about 10 to about 15 microns and lengths under 1" and from 3 to 15% by weight of binder which is a mixture of an alkali metal silicate and a curable phenolic resin, at least one of which is present in dry form.

2 Claims, No Drawings

FIRE RETARDANT COMPOSITION FOR BUILDING PANELS AND DOOR CORES

BACKGROUND AND SUMMARY OF INVENTION

This invention relates to a fire retardant composition and method and, more particularly, to non-combustible particle and wafer boards and doors, being an improvement on my Canadian Application No. 505,878 now Patent No. 1,258,328 and corresponding U.S. Pat. No. 4,746,555.

The aforementioned patents made use of a composition consisting essentially of 30 to 75% by weight of an inert filler selected from perlite and vermiculite, 10 to 30% by weight of wood chips and 3 to 15% by weight of a binder which is a mixture of an alkali metal silicate and a curable phenolic resin, at least one of which was present in dry form. A critical factor of the invention in the above mentioned patents was the use of wood chips (as contrasted to fibers) to provide rigidity and screw holding power. I have now discovered that even superior results can be obtained by substituting glass fibers having a diameter of the order of 10-15 microns and lengths under approximately 1" (25 mm), preferably the longest lengths.

The present invention is applicable, as before, to cores for use in wooden doors, panels such as particle board and wafer board coated with a thin layer of the inventive composition, and like products.

DETAILED DESCRIPTION

Express reference is made hereby to the above mentioned patents and it is requested that these be incorporated into this disclosure so that the ensuing specification may be brief for ease of understanding, the features common to this invention and that of the above mentioned patents being summarized hereinafter.

The binder is a combination of an alkaki metal silicate and a curable phenolic resin. Sodium silicate is preferred as less costly than potassium silicate. The silicate and resin intumesce at a flame temperature of 1850° F. to provide a ceramic layer which is water impervious so as to maintain the integrity of core or panel to which the inventive composition is applied. The binder is present in an amount of 3 to 15% by weight with the silicate being present in an amount from 3 to 10% by weight, more preferably 3 to 7% by weight and the phenolic resin suitably being present in an amount from 6 to 10% by weight (more preferably 6 to 8% by weight). Sodium silicates include those supplied by National Silicates Ltd. under the trademark SS, SS65, G, SSC and GD and Metso and Metso beads 2048, Metso pentabead 20 and Metso 20 supplied by the P.Q. Corporation and those soluble silicates supplied by National Silicates Ltd. under the trademarks R, N, E., 0, K, M. STAR, R, U, D and C and BWND49.

Preferably the phenol resin is a phenol formaldehyde resin such as that supplied under the trademark Bakelite PF911.

The inert mineral filler may be either perlite or vermiculite or a mixture of the two. These provide both bulk and fire retardancy to the composition. Vermiculite is a clay mineral constituent and is hydrogenated magnesium aluminum iron silicate of platelet type crystalline structure and perlite is a volcanic glass.

The glass fibers employed in the inventive composition are suitably available from Fiberglass Canada, Inc. of Toronto, Ontario under product designation 885. These have filament diameters from about 10 to about 15 microns and strand lengths ranging from about 6 to 24 mm, viz., slightly under 1" maximum.

The manufacture of door cores and panels is achieved through the use of a drum mixer where the ingredients, i.e., the glass fibers, the water containing silicate, the dry phenolic resin and the perlite and/or vermiculite are mixed. Thereafter the mixture is poured into trays which are then passed in stacks into presses where the composition is pressed to the desired thickness at a temperature of about 1550° F. to form the product with simultaneous curing of the phenolic resin.

EXAMPLE 1

As an example of the practice of the invention a comparison test was performed utilizing 1½" thick wafer boards of a density of 34 lb/ft³ with identical ingredients and processing except for the substitution of glass filaments in one instance for the wood chips in the previously patented composition. More particularly, the common ingredients included:

| | |
|---|---|
| perlite | 10% by weight |
| vermiculite | 50% by weight |
| dry phenolic resin (Bakelite PF 311) | 8% by weight |
| liquid sodium silicate (waterglass) and water | 6% by weight |
| Total | 74% by weight |

In one instance 26% of wood chips from the chipper and kiln dryer were used while, for comparison, 26% of 13 micron diameter, 6 mm length glass fibers were employed.

Both compositions had suitable strength and fire endurance ratings on wooden doors in accordance with CAN4-S104 and ASTME 152 for a 45 minute rating. More surprising was the fact that the product even with the short glass fibers had an equal or better screw holding strength. Thus, not only did the glass fibers meet all of the critical requirements of the previously patented composition but also eliminated the wood chips which make possible the achievement of a class zero rating for United Kingdom usage. The class 0 rating does not permit any flaming or sparking in fire testing which could not be met by the composition previously patented. The wafer board using wood chips would only meet the Class 1 test in the U.K. which permits some flaming and sparking while standing intact for 1½ hours.

EXAMPLE 2

For thin boards (particle boards), I employ slightly more glass fibers. In this example, boards having thicknesses of 7/16", ½" and ¾" were provided having a density of 40 lb/ft³. For these, I increased the glass fiber content 11%, i.e., from 26% to 37%. This resulted in greater strength and screw holding power. Thus, the glass fiber content can vary from 10% to 40%.

While in the foregoing specification a detailed description of an embodiment of the invention has been set down for the purpose of illustration, many variations in the details hereingiven may be made by those skilled in the art without departing from the spirit and scope of the invention.

I claim:

1. A fire retardant core for a wooden door, said core being a cured pressed sheet of a thickness of at least ½" and having a composition consisting essentially of (a) 30 to 75% by weight of an inert mineral filler selected from the group consisting of perlite and vermiculite, (b) 10 to 40% by weight of glass fibers having a diameter in the range of about 10 to 15 microns and lengths under 1" and (c) from 3 to 15% by weight of a binder which is a mixture of an alkali metal silicate and a curable phenolic resin.

2. A fire retardant building panel which is a cured and pressed sheet of a thickness of at least ½" and having a composition consisting essentially of (a) 30 to 75% by weight of an inert mineral filler selected from the group consisting of perlite and vermiculite, (b) 10 to 40% by weight of glass fibers having a diameter in the range of about 10 to 15 microns and lengths under 1" and (c) from 3 to 15% by weight of a binder which is a mixture of an alkali metal silicate and a curable phenolic resin.

* * * * *